United States Patent [19]

Miura

[11] Patent Number: 4,745,400

[45] Date of Patent: May 17, 1988

[54] ALARM SYSTEM

[76] Inventor: Hirokazu Miura, 4, Kitahiyoshi-cho, Imakumano, Higashiyama-ku, Kyoto, Japan

[21] Appl. No.: 896,209

[22] Filed: Aug. 12, 1986

[30] Foreign Application Priority Data

Aug. 13, 1985 [JP] Japan .............................. 60-178940

[51] Int. Cl.[4] .............................................. G01B 13/00

[52] U.S. Cl. .................................... 340/541; 340/567; 340/529

[58] Field of Search ................ 340/529, 528, 567, 541

[56] References Cited

U.S. PATENT DOCUMENTS

| | | | |
|---|---|---|---|
| 3,449,738 | 6/1969 | Chesnul et al. | 340/528 |
| 3,745,550 | 7/1973 | Anthony et al. | 340/528 |
| 3,828,338 | 8/1974 | Kato | 340/529 |
| 3,858,194 | 12/1974 | Jedynak et al. | 340/528 |
| 4,122,437 | 10/1978 | Petersen | 340/528 |
| 4,485,374 | 11/1984 | Meserow et al. | 340/529 |

FOREIGN PATENT DOCUMENTS

| | | | |
|---|---|---|---|
| 25700 | 2/1979 | Japan | 340/528 |

*Primary Examiner*—Stewart J. Levy
*Assistant Examiner*—Hezron E. Williams
*Attorney, Agent, or Firm*—Lowe, Price, Leblanc, Becker & Shur

[57] ABSTRACT

An alarm system comprising a sensor which detects a human body in a fixed detection area and outputs signals, a delay timer circuit which outputs signals after passing a fixed delay time by turning on an alarm switch, a two input AND circuit in which output signals of the delay timer circuit and the sensor are entered, a latch circuit with a delay timer which outputs signals after passing a fixed delay time from when output signals of the two input AND circuit are entered and keeps the signals being outputed until entry of reset signals.

1 Claim, 5 Drawing Sheets

ALARM SYSTEM

BACKGROUND OF THE INVENTION

1. Field of the invention:

The present invention relates to an alarm system for crime prevention installed mainly for domestic use.

2. Prior art:

Various alarm systems have been proposed which guard against unauthorized entry by means of a pair of magnet switches mounted on movable openings such as doors, windows or the like. Infrared alarm systems are also known in which a moving object is detected by infrared ray sensors installed outdoors, indoors, etc.

The foregoing devices have disadvantages. With the alarm system with the magnet switches, it is necessary to switch it on and off and switching it on again is sometimes forgotten. Moreover, it is often the case that the alarm system is misoperated by children, etc. Also it sometimes happens that a family member goes in and out without switching off the alarm system. Thus, the fact is that the alarm system of this type is not favorably used due to its troublesome operation.

With the infrared ray sensor alarm system, since this alarm system detects pets and family members, it is necessary to disengage the system before entering the house and to switch it on when going out. Since this alarm system operates at night, it cannot distinguish between family members moving about at night and intruders. Thus, the fact is that this alarm system is useful only when nobody is in the house.

Further, with the infrared alarm system, whether it is installed outdoors or indoors, it also senses pets, objects, and with no capability of distinction between family members and intruder. Thus, it is often the case that a main switch is left off and as a result the system does not operate in time of need.

SUMMARY OF THE INVENTION

In view of the foregoing problems, an object of the present invention is to provide an alarm system in which when someone of a family switches on or off an alarm system for passing through a fixed detection area, the system is put on its operable condition with a certain time lag solving thereby troublesome operations required in the prior art.

In order to accomplish the foregoing object, an alarm system according to the invention is characterized by comprising a sensor which detects existence of a human body in a fixed detection area and outputs signals, a delay timer circuit which outputs signals after passing a fixed delay time by turning on an alarm switch, a two input AND circuit in which the signals outputted from said delay timer circuit and said sensor are entered, a latch circuit with a delay timer which outputs signals after passing a fixed delay time from the point of time when output signals of this two input AND circuit are entered and keeps such signal output state until entry of reset signals, and an alarm unit by which alarms are given being operated by the output signals of the latch circuit.

According to the alarm system arranged as above, by keeping the alarm switch "on" at all times to make the delay timer circuit output signals therefrom, when the sensor detects an illegal invader, high level signals are outputted from the two input AND circuit so that warnings are given after passing the delay time of the latch circuit. When someone of a family turns the alarm switch from on to off for going out of his room, if he leaves the room within a time set to the delay timer circuit, the alarm unit is not operated. Further, when someone of the family enters in the room passing through the detection area, by turning off the alarm switch within the time from his passage to the setup time of the latch circuit with a delay timer, the alarm unit is not operated, either.

Other features and advantages of the present invention will become apparent in the course of the following description with the accompanying drawings.

BRIEF DESCRIPTION OF THE DRAWINGS

In the drawing forming a part of the present application and showing an embodiment of the invention.

DESCRIPTION OF THE PREFERRED EMBODIMENT

Referring now to the accompanying drawings, a preferred embodiment of the invention is described in detail hereinafter.

Figure 1:
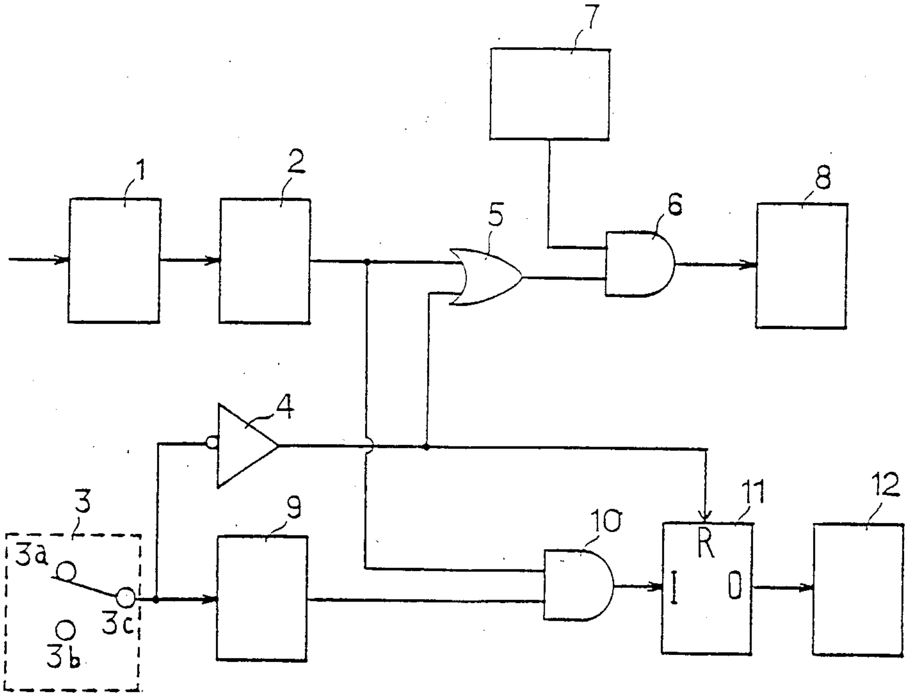
FIG. 1 is a block diagram.

In FIG. 1 showing a block diagram of an alarm system of the invention, reference numeral 1 denotes an infrared ray sensor for detection of living creatures in a fixed detection area and which outputs pulse signals for every movement of a detected living creature but any pulse signal is not outputted when the living creature does not move. This sensor is installed at a height of a trunk of a human body so as to detect human beings only. Numeral 2 is a retriggerable one-shot timer circuit to be retriggered for every input of the pulse signals withina setup time to output signals for such time. Numeral 3 is an alarm switch comprising a foot switch, a touch switch or the like and which is installed on a place known only by family members. This alarm switch can be on or off being turned between a contact point 3*a* for alarming and a contact point 3*b* for releasing the alarm. A common contact point 3*c* of this alarm switch 3 is connected to one input terminal of a two input OR gate 5 by way of an inversion circuit 4, while to the other end thereof output signals of the retriggerable one-shot timer circuit 2 are entered. Numeral 6 is a two input AND circuit in both input terminals of which output signals of the two input OR circuit 5 and those of a illuminance sensor 7 are respectively entered, and a lighting system 8 including an entrance lamp, room lamps, etc. is turned on by high level signal outputs from said two input AND circuit 6. The illuminance sensor 7 is turned on when illuminance stands below a certain level.

Numeral 9 is a delay timer circuit which outputs signals after passing a fixed delay time from the time when the alarm switch 3 is turned on and connected to the contact point 3*a* for alarming. Output signals of this delay timer circuit 9 and the retriggerable one-shot timer circuit 2 are entered in both input terminals of a second input AND circuit 10. Numeral 11 is a latch circuit with a delay timer which outputs signals from an output terminal O after passing a fixed delay timer from the time when the output signals from the second AND circuit are entered in an input terminal I. This latch circuit 11 keeps the signal output until a reset signal is entered in a reset terminal R by way of the inversion circuit 4, and by this output signal an alarm unit 12 such as buzzer is operated.

Figure 2:
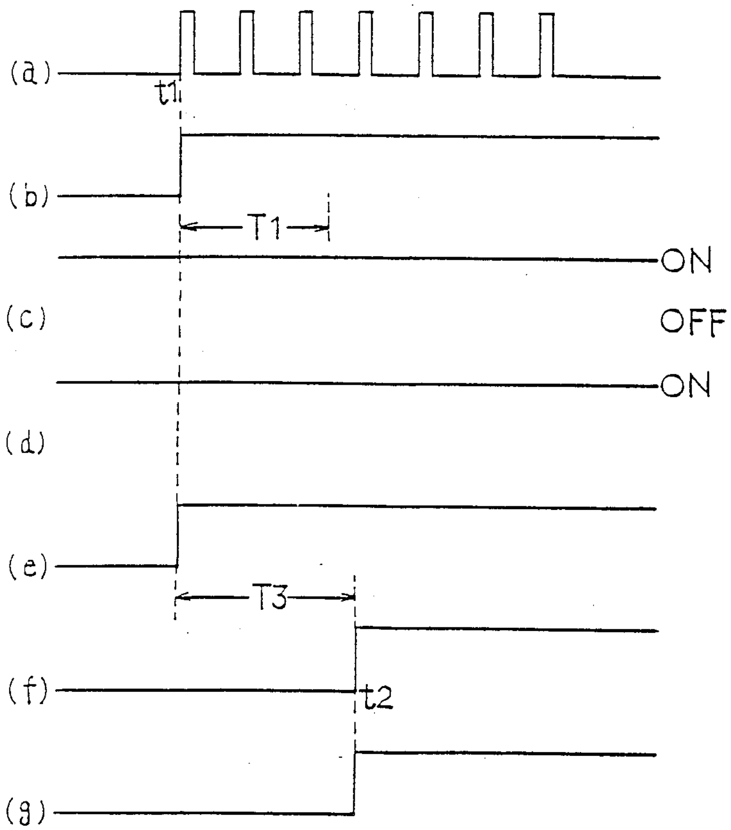
FIG. 2 is a timing chart in the event that an invader enters in a detection area.
Figure 3:
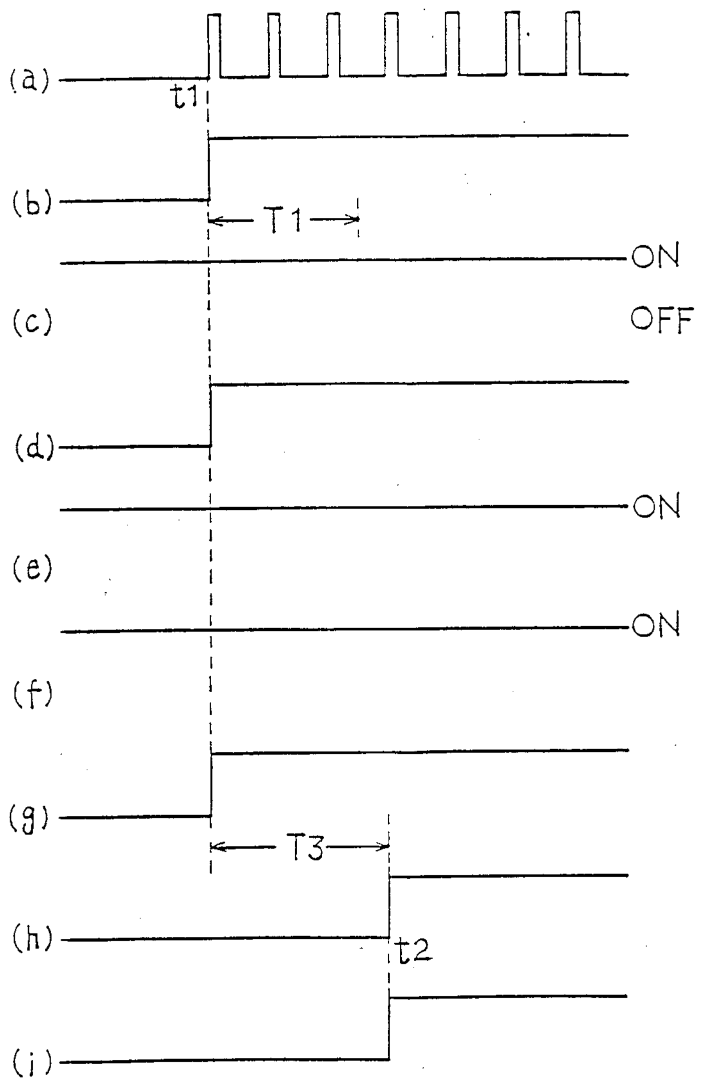
FIG. 3 is a timing chart in the event that an invader enters in the detection area at night.

Referring then to FIGS. 2 and 3, operation of the above-described system is explained hereinafter.

The alarm switch 3 is normally connected to the contact point 3a for alarming to keep the system in a standby state for operation. In this state, if an invader comes in at the time t1 of FIG. 2, the sensor 1 detects the invader every time of his movement and outputs pulse signals as shown in FIG. 2(a), and the one-shot timer circuit 2 also outputs signals as shown in FIG. 2(b). In the meantime, since the alarm switch 3 is on as shown in FIG. 2(c) and the delay timer circuit 9 outputs signals at all times as shown in FIG. 2(d), AND of the second two input AND circuit 10 is satisfied at t1 and high level signals are outputted as shown in FIG. 2(e). At the time t2 after passing the delay time T3 of the latch circuit 11 with a delay timer from the time t1, the circuit 11 outputs signals as shown in FIG. 2(f), and alarms are given by driving the the alarm unit 12 thereby, FIG. 2(g). In addition, if the invader goes away within the setup time T1 of the one-shot timer circuit 2, since this one-shot timer circuit 2 is not regriggered and the output of the two inputs AND circuit 10 goes down to low level at the time t2, any alarm is not given. As a result, when someone of the family members familiar with the system simply passes by, any alarm is not given.

In the event that an invader comes in nighttime, the sensor 1 outputs pulse signals at the time t1 as shown in FIG. 3(a), the one-shot timer circuit 2 outputs signals as shown in FIG. 3(b), and the illuminance sensor 7 is kept on as shown in FIG. 3(c). Accordingly, the lighting system 8 is turned on to threaten the invader. If the invader goes away within the setup time T1 of the one-shot timer circuit 2, since AND of the second two input AND circuit 10 is not attained at the time t2 after passing the setup time T3 of the latch circuit from the time t1, the alarm unit 12 is not operated so as not to give unnecessary alarms. FIG. 3(e) to (i) show each output or operation of the alarm switch 3, the delay timer circuit 9, the second two input AND circuit 10, the latch circuit 11 and the alarm unit 12 in the event that the invader does not go away in spite of the threatening by the lighting system and thus alarms are given to him.

Figure 4:
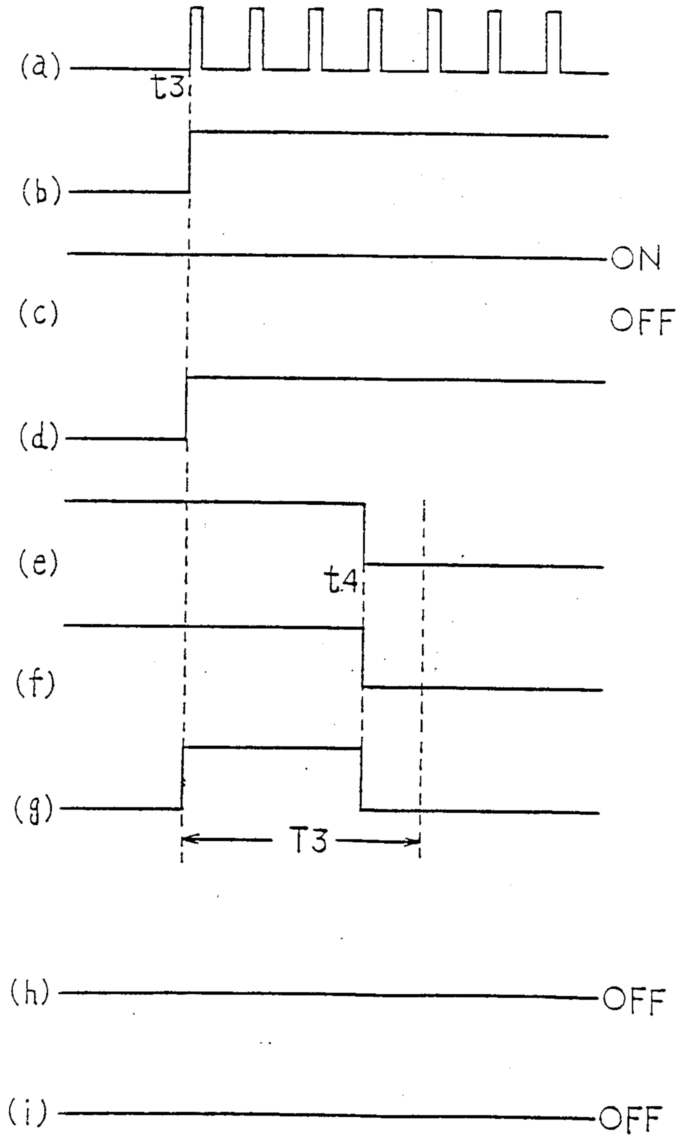
FIG. 4 is a timing chart when a family member enters in a room.

Described hereunder referring to FIG. 4 is a series of operations when someone of a family goes in his house or room passing through the detection area at the time t3. First the sensor 1 outputs detection pulse signals at the time t3 as shown in FIG. 3(a), and at the same time the one-shot timer circuit 2 outputs signals as shown in FIG. 2(b). At this time, since the illuminance sensor 7 detects illuminances lower than a certain level of nighttime and is kept on as shown in FIG. 4(c), the first two input AND circuit 6 outputs high level signals at the time t3 and the lighting system 8 is turned on as shown in FIG. 4(d), thereby it becomes possible for that person to enter in the room without watching his step. After entering in the room, by turning off the alarm switch 3 at the time t4 before passing the delay time T3 of the latch circuit 11 from the time t3, the delay timer circuit 9 does not output any signal as shown in FIG. 4(f), and the output signals of the second two input AND circuit 10 go down to low level as shown in FIG. 4(g). Further, since the reset signal is entered in the latch circuit 12 from the inversion circuit 4 and this latch circuit 11 does not output any signal as shown in FIG. 4(h), the alarm unit 12 is not operated as shown in FIG. 4(i).

Figure 5:
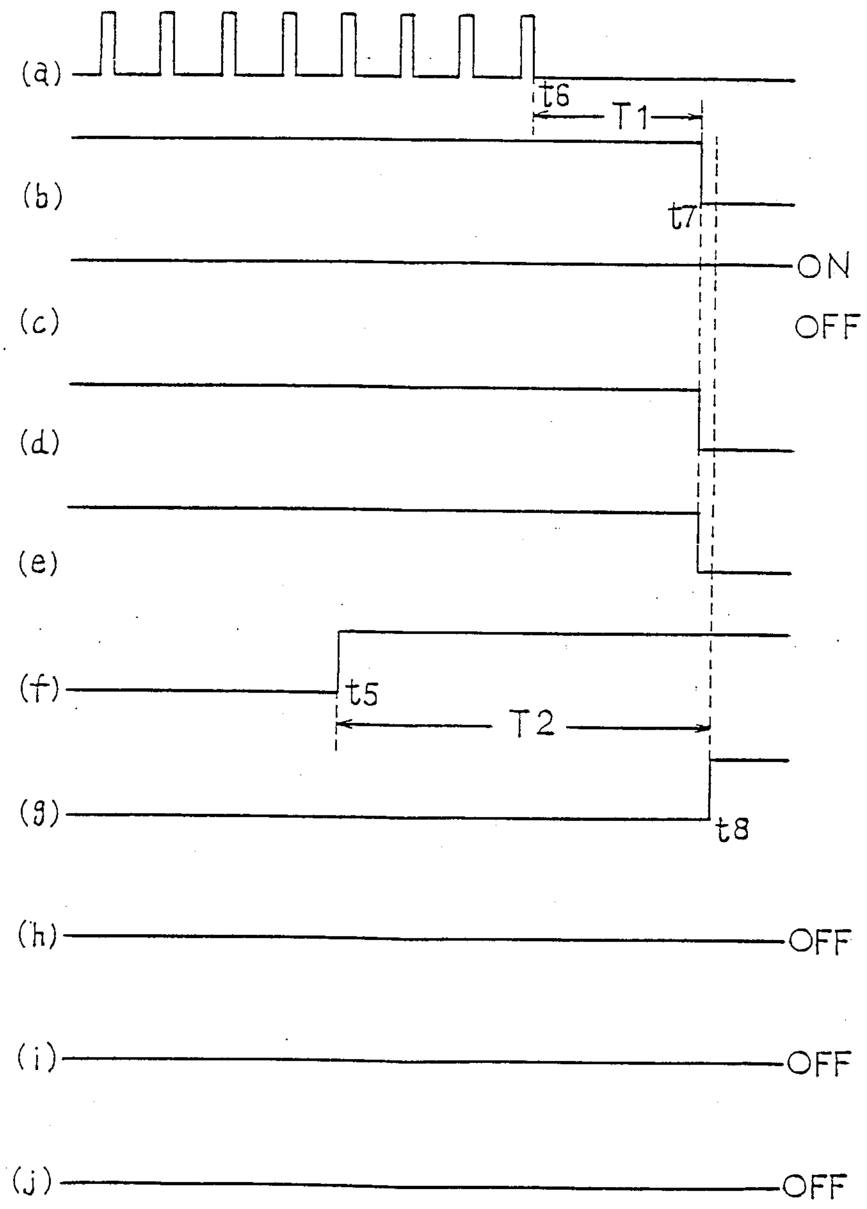
FIG. 5 is a timing chart when a family members leaves the room.

Described hereunder referring to FIG. 5 is a series of operations when someone of a family set the system for going out nighttime. When he passes through the detection area, the sensor 1 outputs detection pulse signals as shown in FIG. 5(a), and the one-shot timer circuit 2 outputs signals as shown in FIG. 5(b). At this time, since the illuminance sensor 7 is kept on as shown in FIG. 5(c), the lighting system 8 is turned on as shown in FIG. 5(e) by the high level output signals of the first two input AND signals 6 as shown in FIG. 5(d). When the alarm switch 3 is turned on at the time t5 for going out at the time t6 as shown in FIG. 5(f), the detection signals from the sensor 1 stop at the time t6, but the one-shot timer circuit 2 outputs signals up to the time t7 after passing the setup time T1 from the time t6, and the lighting system 8 is kept lighting also up to the time t7 and turned off thereafter. Then, at the time t8 after passing the delay time T2 of the delay timer circuit 9 from the time t6, the delay timer circuit 9 outputs signals as shown in FIG. 5(g) and the system is set. But, since the one-shot timer circuit 2 does not output signals at the time t7 prior to the time t8, AND is not attained in the second two input AND circuit 10 as shown in FIG. 5(h). As a result, the latch circuit 11 does not output signals as shown in FIG. 5(i) and the alarm unit 12 is not operated as shown in FIG. 5(j).

In the event that some pet such as dog, cat should enter in the detection area, since the sensor 1 is installed at the height corresponding to a trunk of a human body, the system is not operated.

Although the alarm system of the invention is arranged as above described, the invention is not limited to the above description and the drawings, but includes several modifications and variations thereof. For example, the one-shot timer circuit 2 is not always essential to the invention, and it is also satisfiable that the signals detected by the sensor 1 are directly entered in the two input AND circuit 10. Further, the alarm unit is not always limited to a device for making a sound such as buzzer, but such other device as light projector, emergency call is also satisfiable. When installing the alarm system on the entrance hall or the like, it is possible to make a sound like barks of a dog. In addition, any alarm switch can be used in the invention including foot switch, touch switch, sound sensing switch, etc.

As has been described so far, according to the alarm system of the invention, since the alarm unit is operated with a delay time from the time of outputting the detection signals of the sensor and from the "on" state of the alarm switch, by arranging the lighting system to follow the illuminance sensor, the lighting system is automatically turned on when the sensor detects entrance of someone. And so long as the entrance in the room is within the delay time, any alarm is not given, and the alarm switch can be turned off after the entrance in the room. In the same way, so long as going out of the room is within the delay time after switching on the system, any alarm is not given, though the system is set. That is to say, people of the house can be freely go in and out within a setup time without occurrence of misoperation, which means a great improvement as compared with the conventional alarm system in which when someone of a family enters in a room, it is necessary for him to turn off a sensor switch so as not to give alarms, after that, to turn on a light, and to turn on the sensor switch without fail when going out.

What is claimed is:

1. An alarm system comprising:

a sensor positioned to detect the existence of a human body in a fixed detection area and outputs signals, a delay timer circuit which outputs signals after passing a fixed delay time by turning on an alarm switch, a two input AND circuit in which the signals outputted from said delay timer circuit and said sensor are entered, a latch circuit with a delay timer which outputs signals after passing the fixed delay time from a point of time when output signals of said two input AND circuit are entered, and keeps the signals until entry of reset signals, an alarm unit by which alarms are given by being operated by the output signals of said latch circuit, and wherein a retriggerable one-shot timer circuit, which outputs signals during a setup time from a point of time when the signals detected by the sensor are entered, is interposed between the sensor and the two input AND circuit so that the output signals of the sensor are entered in the two input AND circuit by way of the retriggerable one-shot timer circuit.

* * * * *